United States Patent [19]

Schmidt et al.

[11] Patent Number: 4,682,090
[45] Date of Patent: Jul. 21, 1987

[54] RESOLVER CIRCUIT

[75] Inventors: Karl-Heinz Schmidt; Artur Seibt, both of Vienna, Austria

[73] Assignee: Voest-Alpine Automotive m.b.H., Linz, Austria

[21] Appl. No.: 893,657

[22] Filed: Aug. 6, 1986

[51] Int. Cl.$^4$ .............................................. G05B 1/06
[52] U.S. Cl. ................................. 318/661; 318/636; 340/347 SY
[58] Field of Search ............... 318/661, 636, 654–660; 340/347 SY

[56] References Cited

U.S. PATENT DOCUMENTS

| 4,268,786 | 5/1981 | Röhrle | 318/661 |
| 4,334,179 | 6/1982 | Grimes et al. | 318/661 |
| 4,466,054 | 8/1984 | Shigemasa et al. | 318/636 X |
| 4,518,905 | 5/1985 | Rhodes | 318/661 |
| 4,529,922 | 7/1985 | Ono | 318/661 X |

Primary Examiner—Benjamin Dobeck
Attorney, Agent, or Firm—Thomas R. Vigil

[57] ABSTRACT

A circuit for a function generator, or resolver, employing large air gaps between its stator and rotor and between primary and secondary coils of an automatic transformer supplying its excitation signal is disclosed. The circuit operates to insure that the rotor signal is of sufficient voltage to convey the angular position of the rotor. The voltage of the rotor signal is otherwise subject to variations which are temperature dependent. The function generator and circuit of the present invention allows the use of economic function generators without excess drain on associated power supplies. Frequency of the excitation signal is established by a capacitor in parallel with the excitation terminals. A negative feedback path about an excitation amplifier include a nonlinear member comprising antiparallel diodes. The excitation amplifier determines the amplitude of the excitation signal and hence the amplitude of the rotor signal conveying angular rotor position information. Gain of the negative feedback paths is varied by means of a nonlinear resistor which is responsive to a control signal generated by a microcomputer and combined with feedback from the excitation amplifier.

20 Claims, 2 Drawing Figures

RESOLVER CIRCUIT

BACKGROUND OF THE INVENTION

1. Field of the Invention

This invention relates to resolver circuitry for providing an excitation signal to a resolver and processing an angular position signal from the resolver to compensate for manufacturing tolerances and temperature variations in the application of the resolver.

2. Description of Prior Art

Known function generators (resolvers) provide a rotor winding typically excited with a low frequency alternating current and have a plurality of stator windings which provide signals from which the angular position of the rotor may be determined. Naturally, both angular velocity and acceleration of the rotor may be easily determined. A microcomputer may be employed to provide an appropriate output indicative of angular position, velocity and acceleration. The rotor or exciting winding may be energized through an adjustable transformer which in turn is energized by a signal generator. Such a function generator is described in West German patent application DE No. 34 32 395.

Economical function generators often have relatively large air gaps between their stator and rotor windings. Likewise, relatively large air gaps are often present between the primary and secondary windings of an associated adjustable transformer. Consequently, relatively high input voltage or power is typically employed to energize the primary winding of an associated adjustable transformer. When employed in varying ambient temperatures of relatively wide range, the variance in temperature can lead to significant alteration of the signal provided by the stator windings. As a result of the variation in the stator signals, erroneous indication of the angular position, velocity and acceleration of the rotor, may result.

SUMMARY OF THE INVENTION

The present invention creates a circuit permitting the use of simple and economical function generators under adverse condition while avoiding the above mentioned measuring errors. In particular, no significant measuring error resulting from wide temperature variations, such as that occurring in motor vehicles, are present. The exciting signal to the function generator is modified by the angular position signal of the function generator and the exciting signal is provided to an inductive capacitive circuit comprising the parallel combination of the primary winding of the adjustable transformer with a parallel capacitor. Oscillation circuitry is the source of the exciting signal and employs both positive and negative feedback paths about an amplifying circuit. The inductive capacitive circuit, comprising the parallel primary winding and capacitor, are in the positive feedback path. The negative feedback path includes at least one nonlinear member, which additionally receives a control signal proportional to a maximum value of the rotor signals via a microprocessor. The analog control signals are combined to affect the negative feedback path of the amplifier and thus adjust the excitation signal to the function generator.

This arrangement allows a low power excitation signal at higher frequencies than those normally employed, while maintaining an adequate rotor signal of sufficient amplitude and long term stability. The function generator is always supplied with an excitation signal at the resonant frequency.

Exceptional long term stability of the rotor signal is achieved when a variabale resistance is employed in the negative feedback branch of the amplifier. The variabale resistance conducts the combined control signal from the microcomputer and a signal proportional to that of the oscillator to the inverting terminal of the amplifier. Minimal deviations of the rotor signal are achievable when the combined signal is conducted to the variable resistance through a PI circuit. A simple manner to attain the desired reduction of deviation of the rotor signal and stability in regulation is to employ a field effect transistor. The digital signal provided by the microcomputer may be rapidly and effectively converted to an analog signal by a digital to analaog converting resistance circuit for combination with the signal proportional to the oscillator output.

Since the rotor signal is an analog signal, it must be converted to digital form for presentation to the microcomputer. Peak value circuitry connected to the output of the oscillator supplying the excitation signal may be used to synchronize a sample and hold circuit converting the analog rotor signal to digital form. This insures that the sampling frequency corresponds to the excitation frequency.

DETAILED DESCRIPTION OF THE DRAWINGS

Figure 1:
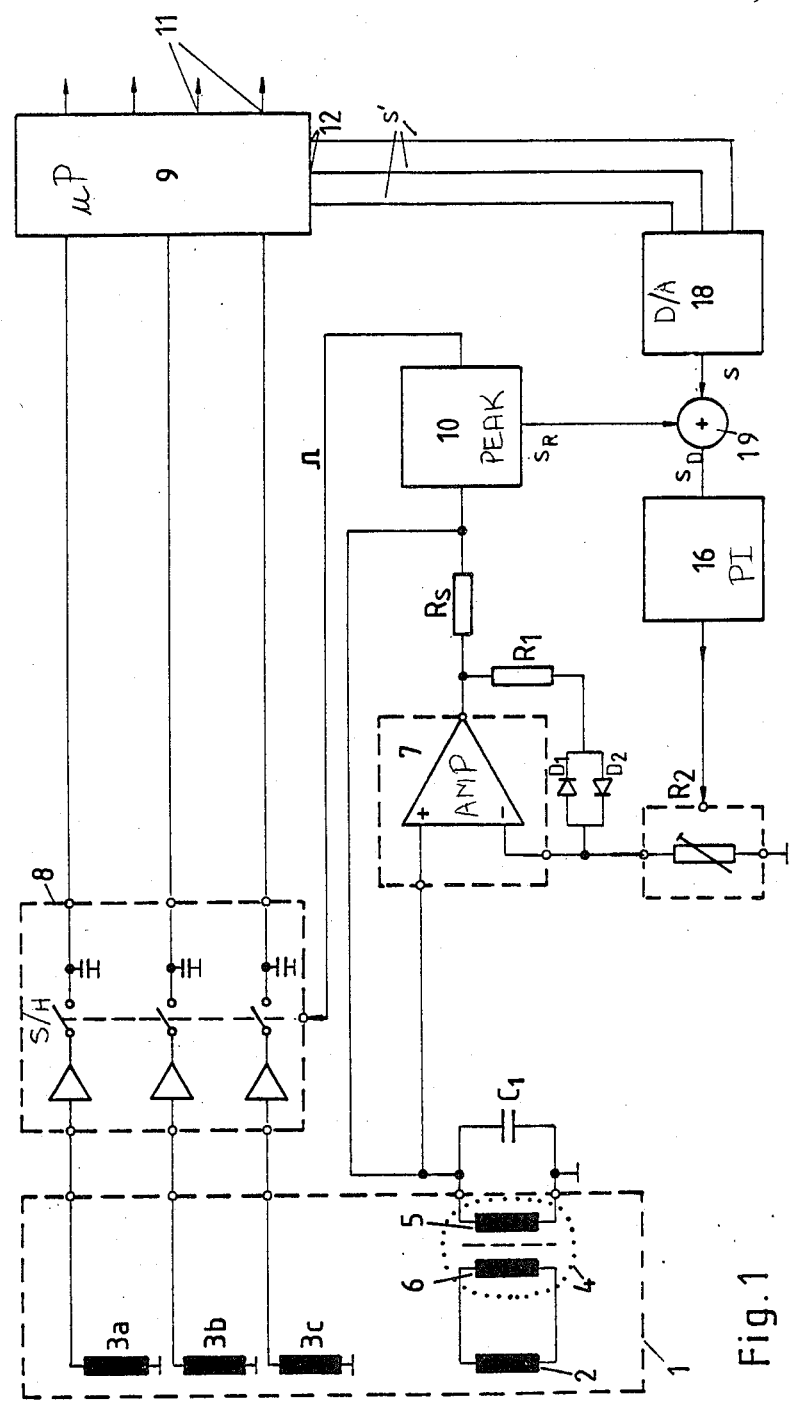
FIG. 1 is a simplified block schematic of a function generator and associated circuitry of the present invention.

As shown in FIG. 1, a function generator 1 is symbolically indicated as having a rotor winding 2 and three stator, or rotor signal, windings 3a, 3b and 3c. An adjustabale transformer 4 having a primary winding 5 and a second winding 6 provide an energization signal to rotor winding 2. Capacitor C1 in cooperation with an inductance of adjustable transformer 4 is placed in parallel with primary winding 5 to essentially fix the resident frequency F0 of the excitation signal. The resident frequency can advantageously be fixed on the order of ten kilohertz (10 KHz). However, the fixing of the resident frequency is not restricted to placing a capacitor in parallel with the primary coil 5 of adjustable transformer 4, but could likewise be fixed by employing a capacitive element in association with the secondary winding 6 of adjustable transformer 4. Alternatively, foil coils could be employed as windings to supply the desired capacitive effects.

Amplifier 7 in its output and positive feedback path provide the source of excitation for the exciting signal applied to primary winding 5. This feedback path may incorporate a variety of elements known in the art and not otherwise discussed or shown. The negative feedback path about amplifier 7 between its output and inverting input includes resistor R1 and nonlinear members shown as antiparallel diodes D1 and D2. The magnitude of gain in this negative feedback path is determined by nonlinear resistor R2 connected between the inverting input and ground which responds to a control signal generated in microprocessor 9 and the output of amplifier 7 in a manner described below. The excitation frequency is primarily determined by primary winding 5 and capacitor C1 which are driven by amplifier 7 in an oscillating mode. The magnitude of the exciting signal powered by oscillation amplifier 7 is set through variable resistor R2 acting as gain altering means. By operating at the resonant frequency, maximum signal power is provided by signal windings 3a, 3b and 3c with a minimum demand on the power supply.

The stator windings provide a rotor signal, from which the position of the rotor may be determined, which is conveyed to microprocessor 9 through sample and hold circuit 8. The sampling frequency is identical to the resonant frequency F0 of the exciting signal and is provided by peak detector 10 in response to the exciting signal.

Microcomputer 9 calculates, in accordance with known routines or programs, the angular position of the rotor of function generator 1. Similarly, microcomputer 9 can provide angular velocity and acceleration data of the rotor. This information is provided to output 11 of microcomputer 9. Additionally, output 12 provides a control signal S' in digital form to digital to analog converter 18. Control signal S' is representative of the maximum value of rotor signals provided by stator windings 3a, 3b and 3c. The analog control signal S provided by digital to analog converter 18 is transmitted to summing means 19. Summing means 19 sums analog control signal S and analog signal SR of peak value detector 10 to provide a difference signal SD which ultimately controls the gain of the negative feedback path about amplifier 7. The difference signal SD is transmitted through PI member 16 to the control input of variable resistance R2 to thereby fix the negative feedback gain of amplifier 7.

The gain of negative feedback path about amplifier 7 is altered to compensate for both manufacturing and wear tolerances of the air gaps present in function generator 1 and is particularly useful to compensate for temperature dependent variation of rotor signal provided by stator windings 3a, 3b and 3c. When the voltage of rotor signals fall, this decline is compensated for by difference signal SD decreasing the gain through the negative feedback path of amplifier 7. As a result, maximum voltage is always present at stator windings 3a, 3b and 3c.

Alternatively, a variable resistance such as R2 could be provided in another negative feedback path so that with increasing voltages of the rotor signal the resistance value of the variabale resistance should be reduced. In this alternate arrangement, a phototransistor driven by a photodiode would serve or as indicated in FIG. 2 a field effect transistor.

Figure 2:
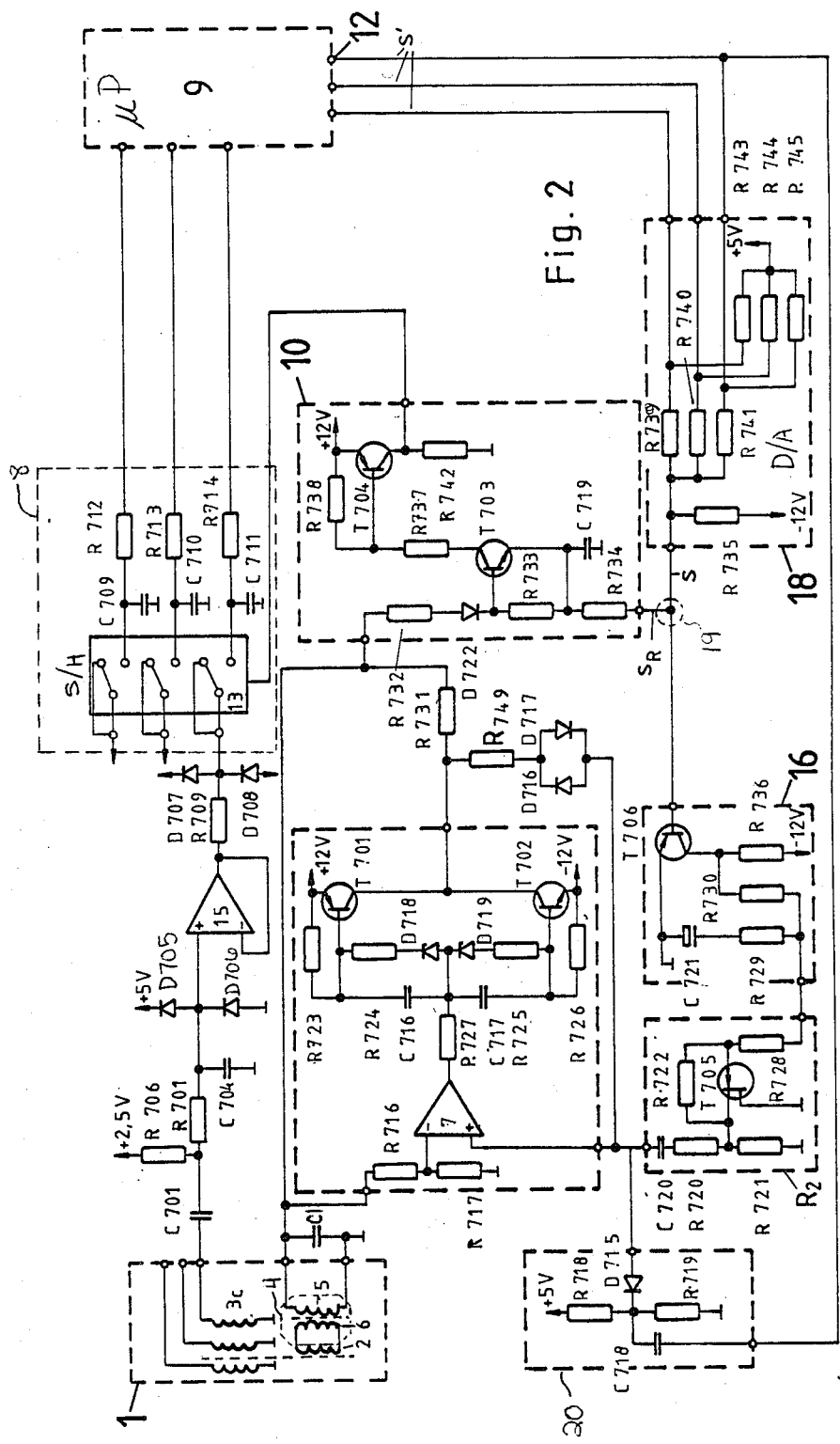
FIG. 2 is a simplified schematic of the function generator and a schematic of associated circuitry in a preferred embodiment of the present invention.

In FIG. 2 the field effect transistor alters the gain of the negative feedback path about amplifier 7. Elements of the invention illustrated in FIG. 2 which correspond to those shown in FIG. 1 bear the same number. For the sake of brevity only the connection to stator winding 3c is illustrated in FIG. 2, but it is to be understood that the same connection is made to stator windings 3a and 3b also. Again, determination of the excitation frequency is primarily a function of primary winding 5 of automatic transformer 4 with capacitor C1 in parallel to primary winding 5. This parallel oscillating circuit is excited by amplifier 7 exciting a push-pull amplifier section including transistors T701 and T702 which provide exciting current through a low-ohmic resistor R731. The drive of this push-pull output stage is provided through output resistor R727 through capacitors C716 and C717 leading to the bases of transistors 701 and 702, respectively. Additional drive is provided to each base through the series circuit of a Zener diode and resistor. The base of transistor 701 is driven through Zener diode 718 and resistor 724 which form a voltage divider with resistor 723 from the positive power supply. Similarly, the base of transistor 702 is driven through Zener diode 719, resistor 725 and resistor 726. These diodes prevent potential over-voltage operation. The push-pull output stage act as a Class B amplifier and has a potential of operating of within about one volt of the available voltage difference. In operation, the excitation signal is about an 18½ volt peak to peak voltage with the difference in power supply voltages of about 24 volts in the entire range of ambient temperatures.

The excitation signal is fed back to the inverting terminal of amplifier 7 to sustain oscillation of the excitation signal.

Amplitude control of the excitation signal is provided through resistor R749 and antiparallel diodes D716 and D717 which provide negative feedback to the noninverting terminal of amplifier 7. The amplitude or gain of the negative feedback path is adjusted through variable resistance R2 which here includes field effect transistor 705. In particular, capacitor C720 leads to the noninverting terminal from a voltage divider comprising resistor 720 and resistor 721 which is tied to ground. Field effect transistor T705 is in parallel with resistor R721 to effectively alter its resistance. As indicated, resistor 722 bridges the gate and drain terminals.

The rotor signal provided by stator winding 3c is conducted from the positive terminal of the winding through capacitor 701 and resistor 701 to the noninverting terminal of operational amplifier 15 which acts as a voltage follower. The working point about which the rotor signal varies is established through resistor 701 and resistor 706 to a low voltage source, here about 2½ volts. Resistor 701 and capacitor 704 act as a low pass filter. Two protective diodes 706 and 705 protect the input of amplifier 15. The output of amplifier 15 is fed through a low value of resistance R709 to one of the terminals of sample and hold circuit component switch 13, here symbolically rendered. In common with the other terminals of switch 13, this terminal is also diode protected against overvoltage.

Switch 13 is a component of the sample and hold circuit designated as 8 in FIG. 1. When one of the switches conducts, a storage capacitor on its output charges up to the value of the input and holds that value until a new sample is taken. Microcomputer 9, through a resistance, may sample the held values at predetermined intervals. For the connected electronic switch, this path includes storage capacitor 711 and resistor 714.

In addition to outputs 11 of microcomputer 9 as indicated in FIG. 1, microcomputer 9 has a three bit output 12 forming signal S' which is proportional to the maximum voltage of the rotor signal furnished by stator windings 3a, 3b and 3c. Digital signal S' is converted by digital to analog converter 18 to analog signal S. The simple analog to digital converter indicated is known in the art and comprises a tapped voltage divider employing resistors 739 through resistors 745. This analog control signal is supplied to the base of transmitter 706 in conjunction with signal SR. The collector of transistor 706 provides a signal, through PI circuit 730 including resistors 730, 729 and capacitor 721, to gate resistor 728 which stabilizes the regulation of the system. The gate of field effect transistor 705 receives these signals, which accordingly vary the resistance of variable resistor R2.

Peak value detector 10 includes transistor 703 whose base is connected to the excitation signal through resistor 732 and diode 722. The emitter of transistor 703 is connected to ground through capacitor 719, while the base of transistor 703 is connected to ground through resistor 733 and capacitor 719. The collector of transistor 703 is connected to the base of transistor 704 through resistor 737. Transistor 704 has its emitter directly connected to the positive power supply while its base is connected through resistor 738. The collector of transistor 704 goes to ground through resistor 742. The collector of transistor 704 is also connected to the strobe input of electronic switch 13 and establishes its sampling rate at the same frequency as the excitation signal F0. Capacitor 719 has a varying voltage which is proportional to the amplitude of the excitation signal SR and is supplied to summing point to establish signal SD which is the effective difference between the control system signal S and the proportional signal SR. In addition to the direct feedback path through antiparallel diode 716 and 717, there is an additional negative feedback path with a relatively small time constant which provides signal SD to regulate the magnitude of the excitation signal and hence the rotor signal.

As the excitation signal swings positively a brief square wave is produced by transistor 703 which in turn ultimately establishes the sampling rate of the electronic switch 13 at the same frequency F0 as the excitation signal.

It is theoretically possible that the circuit element discussed would not be sufficient to commence oscillation under low ambient temperatures to which the regulator might be exposed. To avoid this theoretical possibility, cold start circuit 20 is employed. One of the microcomputer outputs 12 is connected through capacitor 718 and diode 715 to the noninverting output of amplifier 7. In the event that the noise voltage of amplifier 7 does not suffice to commence oscillation, differentiation of a portion of digital signal S' will.

As described above, the resolver circuit has a number of advantages, some of which have been described above and others of which are inherent in the invention.

Also, modifications can be made to the resolver circuit without departing from the teachings of the present invention. Accordingly, the scope of the invention is only to be limited as necessitated by the accompanying claims.

We claim:

1. A resolver circuit for maintaining the quality of the function generator's rotor signal furnished by signal windings of the function generator in accordance with the angular position of the rotor and an excitation signal supplied to the function generator through an adjustable transformer which has a primary winding and a secondary winding, said circuit comprising:
    a capacitor associated with a winding of the adjustable transformer to form a parallel inductive capacitive circuit;
    an oscillation amplifier having inverting and noninverting inputs, and an output which supplies the excitation signal to the primary winding of the automatic transformer which is connected in a positive feedback path about said oscillation amplifier;
    nonlinear means in a negative feedback path about said oscillation amplifier;
    a microcomputer for receiving the rotor signal and generating a control signal representative of the quality of the rotor signal;
    summing means for receiving the control signal and an excitation quality signal representative of the quality of the excitation signal and providing a difference signal representative of the difference between the control signal and the excitation quality signal; and
    gain altering means associated with a feedback path about said oscillation amplifier for altering the gain associated with the feedback path in response to the difference signal.

2. The resolver circuit of claim 1 wherein said nonlinear means is a pair of anti parallel diodes.

3. The resolver circuit of claim 2 wherein said gain altering means is connected to a negative feedback path about said oscillation amplifier and is a variable resistance receiving the difference signal and altering the value of its resistance in response to the difference signal.

4. The resolver circuit of claim 3 further including a PI circuit for receiving the difference signal and transmitting it to said variable resistance.

5. The resolver circuit of claim 3 wherein said variable resistance is a field effect transistor.

6. The resolver circuit of claim 4 wherein said variable resistance is a field effect transistor.

7. The resolver circuit of claim 3 further including a resistive digital to analog converter for receiving a digital control signal from said microcomputer and converting the digital control signal to an analog control signal.

8. The resolver circuit of claim 4 further including a resistive digital to analog converter for receiving a digital control signal from said microcomputer and converting the digital control signal to an analog control signal.

9. The resolver circuit of claim 5 further including a resistive digital to analog converter for receiving a digital control signal from said microcomputer and converting the digital control signal to an analog control signal.

10. The resolver circuit of claim 6 further including a resistive digital to analog converter for receiving a digital control signal from said microcomputer and converting the digital control signal to an analog control signal.

11. The resolver circuit of claim 2 further including
    a peak value detector for receiving the excitation signal and providing a synchronization signal near an absolute maximum of the excitation signal once each cycle; and
    a sample and hold circuit for receiving the rotor signal and sampling the rotor signal at the same frequency as the excitation frequency by being triggered by the synchronization signal, said sample and hold circuit providing the held values of the rotor signal to said microcomputer.

12. The resolver circuit of claim 3 further including
    a peak value detector for receiving the excitation signal and providing a synchronization signal near an absolute maximum of the excitation signal once each cycle; and
    a sample and hold circuit for receiving the rotor signal and sampling the rotor signal at the same frequency as the excitation frequency by being triggered by the synchronization signal, said sample and hold circuit providing the held values of the rotor signal to said microcomputer.

13. The resolver circuit of claim 4 further including a peak value detector for receiving the excitation signal and providing a synchronization signal near an absolute maximum of the excitation signal once each cycle; and a sample and hold circuit for receiving the rotor signal and sampling the rotor signal at the same frequency as the excitation frequency by being triggered by the synchronization signal, said sample and hold circuit providing the held values of the rotor signal to said microcomputer.

14. The resolver circuit of claim 5 further including a peak value detector for receiving the excitation signal and providing a synchronization signal near an absolute maximum of the excitation signal once each cycle; and a sample and hold circuit for receiving the rotor signal and sampling the rotor signal at the same frequency as the excitation frequency by being triggered by the synchronization signal, said sample and hold circuit providing the held values of the rotor signal to said microcomputer.

15. The resolver circuit of claim 6 further including a peak value detector for receiving the excitation signal and providing a synchronization signal near an absolute maximum of the excitation signal once each cycle; and a sample and hold circuit for receiving the rotor signal and sampling the rotor signal at the same frequency as the excitation frequency by being triggered by the synchronization signal, said sample and hold circuit providing the held values of the rotor signal to said microcomputer.

16. The resolver circuit of claim 7 further including a peak value detector for receiving the excitation signal and providing a synchronization signal near an absolute maximum of the excitation signal once each cycle; and a sample and hold circuit for receiving the rotor signal and sampling the rotor signal at the same frequency as the excitation frequency by being triggered by the synchronization signal, said sample and hold circuit providing the held values of the rotor signal to said microcomputer.

17. The resolver circuit of claim 8 further including a peak value detector for receiving the excitation signal and providing a synchronization signal near an absolute maximum of the excitation signal once each cycle; and a sample and hold circuit for receiving the rotor signal and sampling the rotor signal at the same frequency as the excitation frequency by being triggered by the synchronization signal, said sample and hold circuit providing the held values of the rotor signal to said microcomputer.

18. The resolver circuit of claim 9 further including a peak value detector for receiving the excitation signal and providing a synchronization signal near an absolute maximum of the excitation signal once each cycle; and a sample and hold circuit for receiving the rotor signal and sampling the rotor signal at the same frequency as the excitation frequency by being triggered by the synchronization signal, said sample and hold circuit providing the held values of the rotor signal to said microcomputer.

19. The resolver circuit of claim 10 further including a peak value detector for receiving the excitation signal and providing a synchronization signal near an absolute maximum of the excitation signal once each cycle; and a sample and hold circuit for receiving the rotor signal and sampling the rotor signal at the same frequency as the excitation frequency by being triggered by the synchronization signal, said sample and hold circuit providing the held values of the rotor signal to said microcomputer.

20. The resolver circuit of claim 2 further including:
cold start means interconnected with said oscillation amplifier to insure the initiation of oscillation.

* * * * *

UNITED STATES PATENT AND TRADEMARK OFFICE
CERTIFICATE OF CORRECTION

PATENT NO. : 4,682,090
DATED : July 21, 1987
INVENTOR(S) : Karl-Heinz Schmidt et al It is certified that error appears in the above-identified patent and that said Letters Patent is hereby corrected as shown below:

On the title page assignee should read

--(73) Assignee: Voest-Alpine Friedmann Gesellschaft M.B.H., Linz, Austria --.

Signed and Sealed this

Tenth Day of May, 1988

*Attest:*

DONALD J. QUIGG

*Attesting Officer*    Commissioner of Patents and Trademarks